United States Patent

Balasubramanian

(10) Patent No.: US 8,171,246 B2
(45) Date of Patent: May 1, 2012

(54) RANKING AND PRIORITIZING POINT IN TIME SNAPSHOTS

(75) Inventor: Sridhar Balasubramanian, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 734 days.

(21) Appl. No.: 12/131,049

(22) Filed: May 31, 2008

(65) Prior Publication Data

US 2009/0300303 A1    Dec. 3, 2009

(51) Int. Cl.
*G06F 13/00* (2006.01)

(52) U.S. Cl. ...................................................... 711/162

(58) Field of Classification Search .......................... None
See application file for complete search history.

(56) References Cited

U.S. PATENT DOCUMENTS

| | | | |
|---|---|---|---|
| 2002/0073175 A1* | 6/2002 | DeKoning et al. | 709/219 |
| 2004/0010487 A1* | 1/2004 | Prahlad et al. | 707/1 |
| 2004/0250033 A1 | 12/2004 | Prahlad et al. | |
| 2006/0004818 A1* | 1/2006 | Claudatos et al. | 707/101 |
| 2006/0010107 A1* | 1/2006 | Nguyen et al. | 707/3 |
| 2006/0069861 A1 | 3/2006 | Amano | |
| 2006/0095695 A1* | 5/2006 | Daniels et al. | 711/162 |
| 2006/0265568 A1 | 11/2006 | Burton | |
| 2007/0204120 A1* | 8/2007 | Garimella et al. | 711/162 |

* cited by examiner

*Primary Examiner* — Duc Doan

(74) *Attorney, Agent, or Firm* — Luedeka Neely Group, P.C.

(57) ABSTRACT

A storage area network system having a data storage means for storing computer data, a storage manager routine running on a client, the storage manager routine having functional elements for directing snapshots to be taken of the computer data on the data storage means, and a snapshot ranking manager for determining characteristics of the snapshots, and for selectively deleting given ones of the snapshots based at least in part on the characteristics of the snapshots. The characteristics of the snapshots might include the type of application that uses the data in the logical volume from which the snapshots were taken, or mission critical aspects of the data.

6 Claims, 1 Drawing Sheet

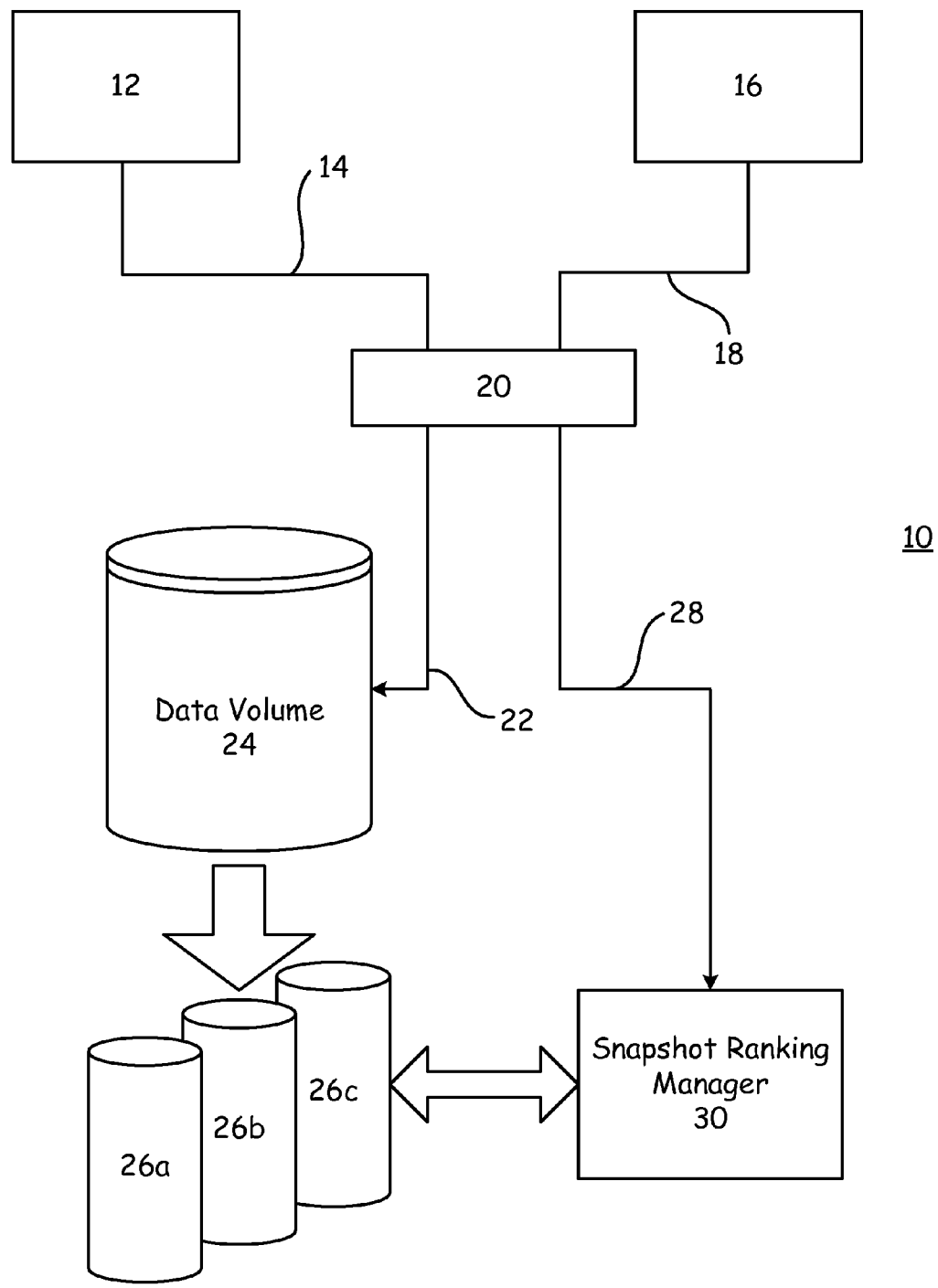

RANKING AND PRIORITIZING POINT IN TIME SNAPSHOTS

FIELD

This invention relates to the field of computerized data storage systems management. More particularly, this invention relates to snapshot management for storage area networks.

BACKGROUND

Storage area networks (SANs) are networks of computer data storage devices that are attached to servers in such a way that they appear to each and every server to be a locally attached storage device, instead of a remotely attached storage device. The topography of a SAN is such that data travels according to one or more extremely high bandwidth interface, such as Infiniband, Fiber Channel, Ethernet, or SAS, and protocols such as SCSI. SANs are typically managed by a remote storage manager program, such as SANtricity, provided by LSI Corporation of Milpitas, Calif.

Storage manager software such as SANtricity optionally offer a volume snapshot feature that provides a point-in-time image of a SAN storage volume. The snapshot is the logical equivalent of a complete physical copy, but is created much more quickly and requires less disk space. Snapshot volumes appear and function as standard storage volumes. They are host-addressable and can be read, written to, or copied.

Volume snapshot enables nonproduction, backup, or analysis servers to access an up-to-date copy of production data while the production data remains online and user-accessible. Volume snapshot is designed for users whose data availability cannot be disrupted for routine management functions. Volume snapshot supports round-the-clock processing as it stages data for operations such as backup, data mining/analysis, and work distribution. In other words, some operations that do not tolerate continuous data access, such as a backup operation, can be performed on snapshot data instead of live data. Thus, the process of taking a snapshot is not the same as merely making a backup.

This functionality requires minimal dedication of storage capacity, typically only about ten to twenty percent of the original SAN volume, enabling the storage of several snapshots within the space required for a single mirror. However, snapshot volumes have the same high-availability characteristics as standard storage volumes, such as RAID protection and redundant path failover.

However, multiple snapshots do take some amount of space, and there is always an incentive to reduce the amount of space used by snapshots. What is needed, therefore, is a system for managing snapshots of a SAN.

SUMMARY

The above and other needs are met by a storage area network system having a data storage means for storing computer data, a storage manager routine running on a client, the storage manager routine having functional elements for directing snapshots to be taken of the computer data on the data storage means, and a snapshot ranking manager for determining characteristics of the snapshots, and for selectively deleting given ones of the snapshots based at least in part on the characteristics of the snapshots. The characteristics of the snapshots might include the type of application that uses the data in the logical volume from which the snapshots were taken, or mission critical aspects of the data.

BRIEF DESCRIPTION OF THE DRAWING

Further advantages of the invention are apparent by reference to the detailed description when considered in conjunction with the FIGURE, which is not to scale so as to more clearly show the details, wherein like reference numbers indicate like elements, and which depicts a storage area network according to an embodiment of the present invention.

DETAILED DESCRIPTION

The embodiments of the present invention provide a system in which the snapshots are ranked and prioritized based on the importance and critical aspect of any changes that have been made, and automatically destroyed in real-time when one or more of the snapshots are no longer needed, to conserve disk space and enhance performance and storage space utilization. The system maintains the snapshots until they are needed, and then destroys them once any necessary backups and later point-in-time snapshots have been acquired.

The system internally generates snapshots in real-time on specific deterministic intervals, such as user-selectable intervals, upon new writes being propagated to a volume. The snapshots are then ranked by their order of importance, which is derived by the degree of change in data content from the previous snapshot (captured in an earlier time frame) so that only the desired snapshots according to the algorithm are retained, and the snapshots that were created earlier and are no longer needed are deleted or otherwise destroyed to conserve disk space and to enhance storage system performance.

Ranking snapshots according to their relative importance is performed according to criteria input to or generated by the snapshot manager program, which in one embodiment is implemented in the controller firmware for the SAN. In one embodiment, the mechanism and the implementation is accomplished in the manner next described.

The user selects the time interval for the creation of the snapshots. If no interval is selected, then a default setting is implemented, which creates snapshots upon every minute or upon occurrence of a read or write operation to a volume within the storage array. The snapshots are compared to each other (a previous snapshot is compared to the next snapshot), and a given snapshot is retained if there are data content changes that meet or exceed the specified criteria.

In some embodiments, any change to the data content is sufficient for a snapshot to be retained. In other embodiments, the criteria might include a minimum amount of the data that must change, or certain types of changes, or certain data that changes. The comparison mechanism of some embodiments is similar to the 'diff' command used in UNIX operating systems. If there are no differences in the data content (or the snapshots otherwise do not meet the criteria), then the snapshot that was created during the earlier point-in-time is destroyed, and the snapshot that was created during the later point-in-time is retained.

Among the snapshots that are retained, a ranking mechanism is employed to rank them by relative importance based on the criteria provided to, resident in, or generated by the snapshot manager, which in some embodiments includes the past state of the application when the snapshots were created. The snapshot manager then provides location specific information and faster access to the higher ranked snapshots.

Lower ranked snapshots are eventually destroyed based on criteria such as a user-selectable snapshot purging interval for the lower ranked snapshots.

In some embodiments, the number of snapshots that are to be kept at any given point in time is a user-selectable number. This number only applies to snapshots that have data content differences, as taken from the same logical volume. All of the snapshots that are retained have priority ranking that in some embodiments is based on the type of application that uses the logical volume, and mission critical aspects of the data. For example, if the snapshot is taken from a logical volume that is hosting a mirror volume's repository, this snapshot is ranked higher than a snapshot taken from a logical volume that is being used as a mere file sharing volume. All ranked snapshots also have location specific information in the realm of storage array for a shorter seek time. In some embodiments, those snapshots with lower priority rankings might be deleted if storage space falls below a defined amount, and higher priority snapshots need to be saved.

The system according to the embodiments of the present invention provides many benefits and advantages. For example, the system provides faster access to higher ranked snapshots, while lower ranked snapshots can be destroyed to conserve disk space and system performance. Prior point-in-time snapshots can be automatically destroyed when there is no data content change when compared to later point-in-time snapshots, or when other criteria are met. The system also provides for user-selectable snapshot generation and purging intervals. The embodiments of the system can guarantee data integrity because of the continuous snapshot generation in real-time, which in some embodiments is based on new reads or writes to the volumes.

With reference now to the FIGURE, there is depicted a system 10 according to one embodiment of the present invention. The system 10 depicts a portion of a network, including an I/O attached server 12 that directs data storage and retrieval in a SAN, connected to a data storage system 20, such as by network 14, such as a Fiberchannel, Ethernet, or SAS connection. A storage manager client computer 16 is also attached to the network and the storage system 20, such as by an Ethernet network connection 18.

The data storage system 20 is functionally represented by the data volume 24, which is connected to the data storage system 20, such as by network 22, such as a Fiberchannel, Ethernet, or SAS connection. Under the control of the storage manager 16, a snapshot group of snapshots 26a, 26b, and 26c is taken of the data volume 24 at desired intervals.

A snapshot ranking manager 30 is also connected to the data storage system 20, such as by an Ethernet connection 28, and receives snapshot ranking information from the storage manager 16. The snapshot ranking manager interrogates the snapshots 26, to determine the characteristics of each, such as degree of difference between the data sets represented in each snapshot 26. If any difference exists, or if a desired level or type of difference exists, then the snapshot ranking manager 30 can delete or otherwise destroy older snapshots 26c, for example, and only retain newer snapshots 26a, for example.

By using the snapshot ranking manager 30 in this manner, only the snapshots 26 that are deemed sufficiently important to the system users or administrators are retained, and the storage space used for the deleted snapshots 26 is released to the storage system, and is available for new data to overwrite. Alternately, if the snapshots 26 are written in a dedicated location of the data storage system, then the space can be released for additional snapshots 26 to be generated.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A storage area network system, comprising:
   a data storage means for storing computer data,
   a storage manager routine running on a client, the storage manager routine having functional elements for directing snapshots to be taken of the computer data on the data storage means, and
   a snapshot ranking manager for,
      determining characteristics of the snapshots, where the characteristics of the snapshots comprise a user-defined importance of changes between snapshots,
      ranking the snapshots according to their characteristics, and
      deleting some of the snapshots based on the rankings of the snapshots and a user-defined schedule, where the user-defined schedule includes at least one of snapshot storage limit and snapshot deletion interval.

2. The storage area network system of claim 1, wherein the characteristics of the snapshots include at least one of a type of application that uses data in a logical volume from which the snapshots were taken, and mission critical aspects of the data.

3. In a storage area network system of the type having a data storage means for storing computer data, and a storage manager routine running on a client, the storage manager routine having functional elements for directing snapshots to be taken of the computer data on the data storage means, the improvement comprising a snapshot ranking manager for determining characteristics of the snapshots, and for selectively deleting given ones of the snapshots based at least in part on the characteristics of the snapshots and a user-defined schedule, wherein the characteristics of the snapshots include user-defined importance of changes between snapshots, and the user-defined schedule includes at least one of snapshot storage limit and snapshot deletion interval, the snapshot ranking manager further for ranking remaining, non-deleted snapshots according to user-defined criteria.

4. The storage area network system of claim 3, wherein the characteristics of the snapshots include at least one of a type of application that uses data in a logical volume from which the snapshots were taken, and mission critical aspects of the data.

5. A snapshot ranking manager program disposed on a non-transitory computer readable medium, the program having functional elements for determining characteristics of snapshots, and for selectively deleting given ones of the snapshots based at least in part on the characteristics of the snapshots and a user-defined schedule, wherein the characteristics of the snapshots include importance of changes between snapshots, and the user-defined schedule includes at least one of snapshot storage limit and snapshot deletion interval, the snapshot ranking manager further for ranking remaining, non-deleted snapshots according to user-defined criteria.

6. The snapshot ranking manager of claim 5, wherein the characteristics of the snapshots include at least one of a type of application that uses data in a logical volume from which the snapshots were taken, and mission critical aspects of the data.

* * * * *